United States Patent [19]

Koritnik

[11] 4,275,915
[45] Jun. 30, 1981

[54] VEHICLE CLOSURE

[76] Inventor: Michael Koritnik, 3350 Dunn, Cheyenne, Wyo. 82001

[21] Appl. No.: 968,621

[22] Filed: Dec. 11, 1978

[51] Int. Cl.³ .............................................. B62D 25/10
[52] U.S. Cl. ........................................ 296/76; D12/92
[58] Field of Search ........................ 296/146, 185, 76; D12/92, 86; 49/381, 401

[56] References Cited

U.S. PATENT DOCUMENTS

| D. 199,900 | 12/1964 | Porsche .................................. D12/92 |
| D. 212,152 | 9/1968 | Haga ...................................... D12/92 |
| D. 222,639 | 11/1971 | Wilfert et al. ......................... D12/92 |
| D. 233,512 | 11/1974 | Love ...................................... D12/92 |
| D. 237,163 | 10/1975 | Miller .................................... D12/92 |
| 2,733,096 | 1/1956 | Waterhouse .......................... 296/185 |
| 3,680,910 | 8/1972 | Stenner ................................. 296/76 |
| 3,909,060 | 9/1975 | Katayama ............................. 296/76 |
| 4,006,933 | 2/1977 | Simpson ............................... 296/95 R |

*Primary Examiner*—Robert R. Song
*Attorney, Agent, or Firm*—Jack E. Ebel; Stephen A. Gratton

[57] ABSTRACT

A hatchback or liftback closure having a frame member and a body member fixedly secured thereto is provided for retrofitting to a motor vehicle. The body member is integrally formed by a roof portion, a window portion depending from the roof portion at an acute angle greater than 60° and having a window therein, a rear deck portion extending from said window portion in a substantially perpendicular manner and side portions extending from said roof portion a predetermined distance and uniformly arced along substantially the entire length thereof to the rear deck portion where both side portions terminate.

11 Claims, 3 Drawing Figures

U.S. Patent  Jun. 30, 1981  4,275,915
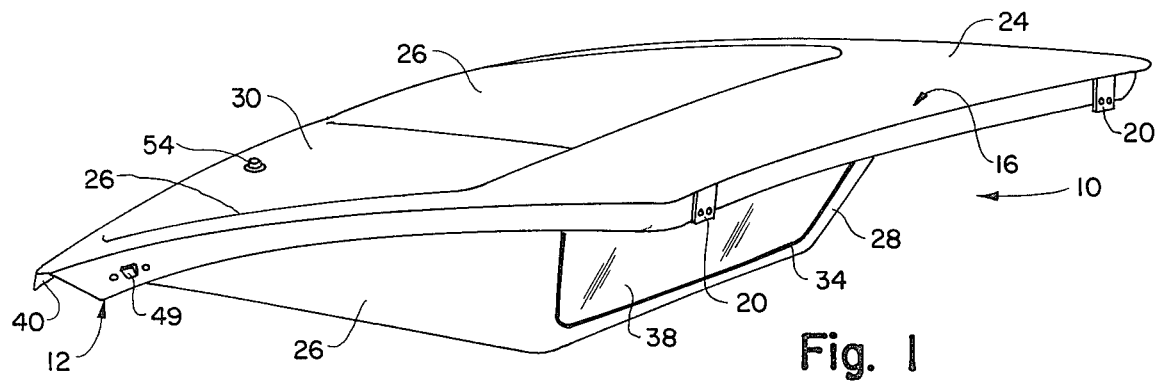
Fig. 1
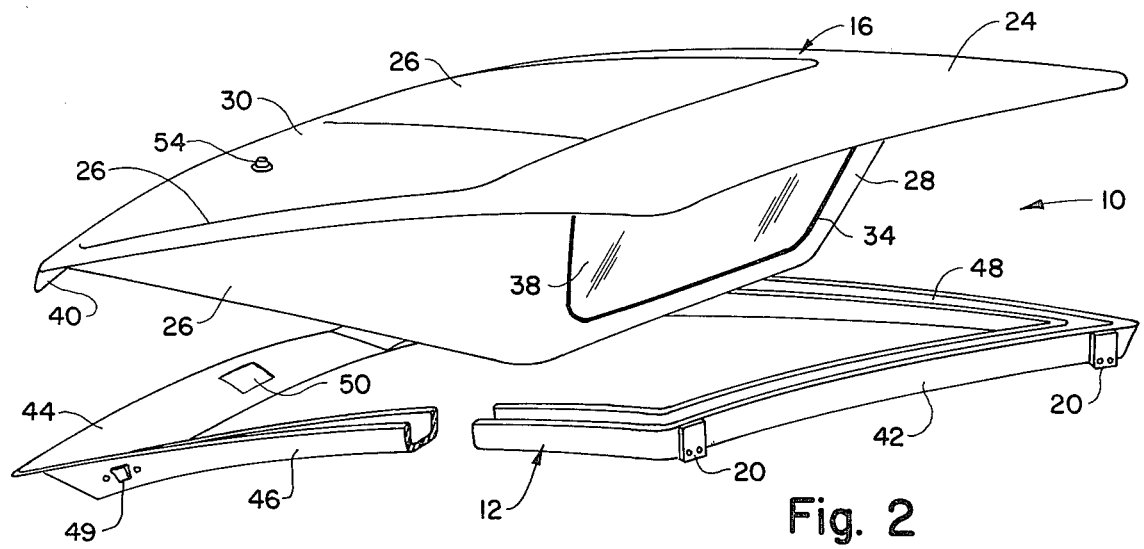
Fig. 2
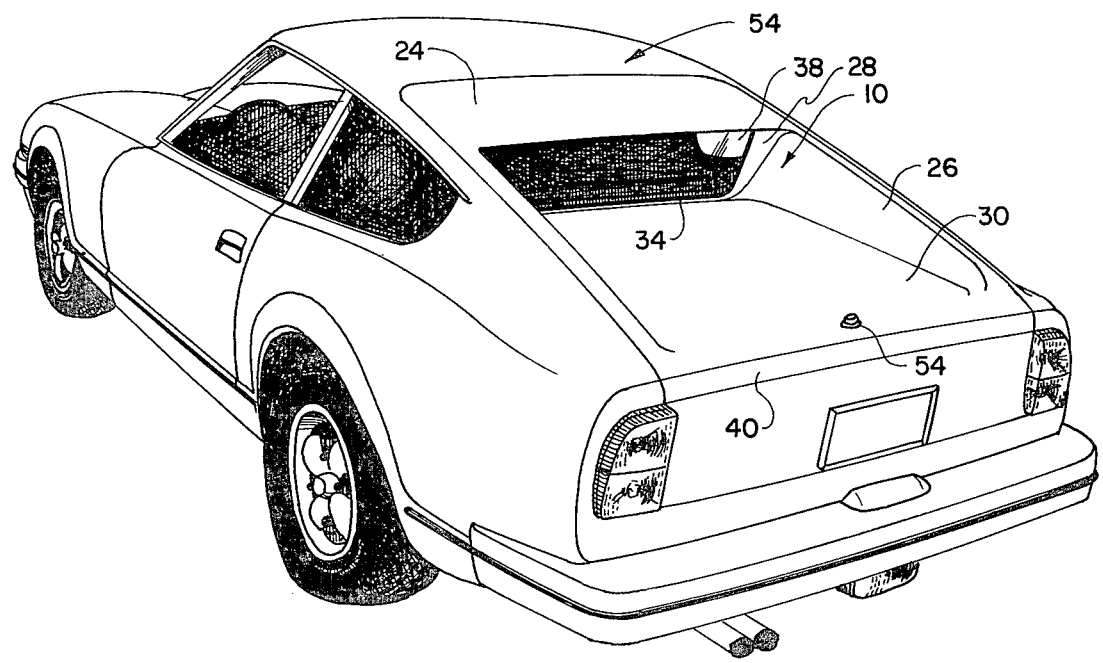

VEHICLE CLOSURE

BACKGROUND OF THE INVENTION

This invention relates to motor vehicle hatchback or liftback closures, and more particularly, to a motor vehicle hatchback or liftback closure for shading the interior of such vehicle from prolonged exposure to the sun and for restricting vision into the storage compartment of such vehicle thereby minimizing theft of items positioned therein.

Due to increasing acceptance of hatchback or liftback closures for motor vehicles by both the consuming public and vehicle manufacturers in recent years, most domestic and foreign motor vehicle manufacturers currently produce at least one line of vehicles having a hatchback or liftback closure. Such closures are conventionally hinged at the rear edge of the roof of the vehicle and evenly slope across the entire width thereof from the rear edge of the roof to the rear, tail light portion of the vehicle body to which the closure is releasably secured by a locking latch or the like. Most of these closures include a relatively large, evenly sloped window therein so as not to obstruct the rear vision of the operator of the vehicle. When such hatchback or liftback closure devices are utilized, most vehicles are provided with a rear trunk area having a relatively longer length, and therefore, providing a more convenient storage space.

However, despite all the advantages offered by such hatchback or liftback closures, these closures possess several serious disadvantages. One such disadvantage of these closures is that the relatively large window utilized in these closures exposes a relatively large surface area of the interior passenger compartment and storage compartment of the vehicle to direct solar rays. Solar exposure of limited duration may cause discomfort to vehicle passengers, while prolonged exposure can damage the upholstery and carpeting of the vehicle passenger compartment or items positioned in the storage compartment. Further, during warm weather such exposure can increase cooling requirements of the passenger compartment and, therefore, fuel consumption of the vehicle. Another disadvantage is created by the relatively large window surface in such closures since items in the storage compartment of the vehicle are readily visible from the exterior thereof, and therefore, subject to increased theft. Thus, it can be seen that a need exists for an improved hatchback or liftback closure for motor vehicles.

Accordingly, it is an object of the present invention to provide a hatchback or liftback closure for a motor vehicle which substantially shades the passenger compartment of the vehicle from direct exposure to solar rays through the window located in the closure.

It is a further object of the present invention to provide a hatchback or liftback closure for a motor vehicle which restricts vision from the exterior of the vehicle into the storage compartment thereby minimizing theft of items positioned in such compartment. These and other objects and advantages of the invention will be apparent from the following detailed description and drawing.

BRIEF SUMMARY OF THE INVENTION

Briefly, the present invention relates to a hatchback or liftback motor vehicle closure having a generally parallepiped frame member and a body member fixedly secured thereto and is provided for retrofitting to the vehicle. The frame member is formed by a pair of substantially parallel, spaced apart end members and a pair of substantially parallel, spaced apart side members which are integrally connected to the end members. The body member is integrally formed by a roof portion, a window portion, a rear deck portion and side portions. The roof portion extends the entire width of the closure and defines a peripheral edge of the closure. The window portion depends from the roof portion at an acute angle greater than 60°, preferrably greater than 80°, and most preferably 90°, and has a window positioned therein. The rear deck portion extends substantially perpendicularly from the window portion and terminates in a perpendicularly biased flange which extends along substantially the entire width of the closure. Side portions extend from the roof portion substantially to the biased flange and are arced along substantially the entire length thereof from the edge thereof to the rear deck portion where both side portions terminate. The side portions are beveled at the termination thereof so as to provide for a smooth transition. Also, the outer peripheral configuration of the body member is sized to uniformly overlap the frame member.

BRIEF DESCRIPTION OF THE DRAWINGS

The invention will be more readily understood by reference to the accompanying drawing wherein like reference numerals indicate like elements wherever applicable and in which:

FIG. 1 is a perspective view of the hatchback or liftback closure of the present invention;

FIG. 2 is an exploded, partially cut away perspective view of the hatchback or liftback closure of the present invention; and FIG. 3 is a perspective view of the hatchback or liftback closure of the present invention as installed in a motor vehicle.

DETAILED DESCRIPTION

The invention relates to a hatchback or liftback closure which is retrofitted to a motor vehicle initially equipped with a dissimilar hatchback or liftback closure, and more particularly to such a hatchback or liftback closure which functions to reduce solar exposure and damage to the passenger compartment of the vehicle, to decrease fuel consumption of the vehicle and to reduce theft of items positioned within the storage compartment of the vehicle.

Referring now to FIG. 1, the hatchback or liftback closure of the present invention, illustrated generally as 10, comprises a generally parallelepiped shaped frame member 12 and a body member 16. The frame member 12 has at least one hinge, illustrated as a pair of hinges 20, fixedly secured to one end thereof by any suitable means, such as by rivets or screws (not illustrated). Hinges 20 are preferrably constructed of steel. Frame member 12 may be constructed of any suitable material in any suitable manner. For example, the frame may be formed by molding fiberglass resin. The body member 16 comprises a roof portion 24, side portions 26, a window portion 28 and a rear deck portion 30. Body member 16 has a generally parallelpiped peripheral configuration which substantially conforms to the outer peripheral configuration of the frame member, as hereinafter described. The roof portion 24 is dimensioned to extend across the entire width of body member 16 and to extend toward the rear of the closure a predetermined distance. The upper edge of the roof portion defines the upper peripheral edge of closure 10 as mounted on a vehicle. Side portions 26 are integral with and extend from the roof portion rearwardly, one edge of each side portion defining a peripheral edge of closure 10. Each side portion is arced downward from the peripheral edge thereof toward the rear deck portion substantially along the entire length thereof. Thus, as assembled on a vehicle, each side portion has a convex cross sectional configuration. Each side portion integrally terminates along the entire length thereof into the rear deck portion 30. Preferably, each side portion is beveled along substantially the entire length of such termination so as to provide for a smooth transition with the rear deck portion.

Window portion 28 depends perpendicularly downward or at an acute angle greater than 60° from roof portion 24 a predetermined distance. Preferably, the window portion forms at least an 80° angle with the roof portion and, most preferably, the window portion is substantially perpendicular to the roof portion. The window portion 28 may extend downwardly from the lower edge of the roof portion 24 or, alternatively, may be recessed to extend downwardly as aforedescribed from a position in the interior of roof portion 24 substantially parallel to the lower peripheral edge. Window portion 28 may be arcuate, but is preferably planar. A window 38 is positioned within an aperture in window portion 28 having a corresponding configuration sized so as to receive the window. Weather stripping 34 is positioned between window 38 and window portion 28 to seal the passenger compartment and storage compartment of the vehicle from the elements. Rear deck portion 30 extends rearwardly from the bottom edge of window portion 28 to the rear peripheral edge of closure 10 and terminates in a downwardly biased flange 40 which extends along substantially the entire width of closure 10. The rear deck portion 30 extends rearwardly substantially perpendicular to window portion 28. The rear deck portion 30 is provided with a centrally located aperture 54 near the rear peripheral edge thereof for positioning of a latch therethrough.

It is to be understood that the portions just described integrally form body member 16. The body member will be constructed of a uniform thickness such as, for example, 0.25 inches and will have an exterior finish comparable to that of the other vehicle body portions.

As shown in more detail in FIG. 2, the substantially parallelepiped frame member 12 of the present invention is integrally formed by substantially parallel, spaced apart end members 42, 44 and by substantially parallel, spaced apart side members 46, 48. End member 42 has a substantially U-shaped cross section along the entire length thereof. Side members 46, 48 have a substantially U-shaped cross sectional configuration and are integrally connected to end member 42 at the upper end thereof so as to define a continuous U-shaped channel. The inner wall of both U-shaped side members is uniformly tapered along the entire length thereof. Where the side members are integrally connected to end member 44, the inner wall of the U-shaped member terminates. End member 44 has a rectangular cross section and the lower edge is integrally connected to side members 46, 48 where the inner walls thereof terminate. The end member 44 is tilted so that the appropriate surface thereof abuts body member 16 when assembled with frame member 12. The upper edge of end member 44 is integrally connected to the outer wall of side members 46, 48, as illustrated. End member 44 is provided with centrally positioned aperture 50 which is aligned with aperture 54 in body member 16, as assembled, to allow for positioning of a latch therethrough. Further, conventional hatch guides 49 are provided on the outer surface of the outer wall of each side member 46, 48 so as to provide for alignment of closure 10 by engagement with corresponding grooves on the vehicle. Frame member 12 can be constructed of any suitable material in any suitable manner, such as by molding fiberglass resin.

Referring again to FIG. 1, the frame member and body member of the present invention are illustrated as fixedly secured together. Although any suitable means and manner of assembly may be employed, a preferred means and manner are hereinafter described. The upper surfaces of frame member 12, i.e. those surfaces to contact body member 16, are ground so as to provide a sufficiently rough surface for adhesion. Fiberglass resin is uniformly placed within a suitable body mold. Fiberglass matting may be positioned on the resin at stress areas of the body member. Before the resin has fully cured, the frame member 12 is placed on body member 16 while still within the mold so that the outer peripherey of body member 16 overlaps end member 42 and side members 46, 48 by, for example, 0.25 to 0.75 inches. As illustrated, window portion 28 and substantially all of the side portions 26 and rear deck portion 30 extend through the frame member when assembled therewith. Flange 40 is contiguous to and overhangs end member 44 so as to conceal the same when so assembled. Once the resin is fully cured, the assembled hatch is removed from the body mold and the outer surface thereof is sanded, primed and lacquered. A suitably sized window is positioned within the aperture in window portion 28 by first lining the aperture with weather stripping and thereafter forcing the window into an interference fit with the aperture where it is secured against movement by the weather stripping.

Once the hatchback or liftback closure of the present invention is fully assembled, the closure is installed into the body of a motor vehicle. As illustrated in FIG. 3, a motor vehicle having an integral body 54 is retrofitted with closure 10, i.e., hinges 20 are fixedly secured to the edge of the vehicle roof by any suitable means, such as, bolts (not illustrated). Flange 44 abuts the rear tail light portion of the vehicle. In a preferred manner of installation, the existing closure is disassembled from the vehicle body and the closure of the present invention is positioned in the appropriate opening in the vehicle body. The rear of the closure is lifted thereby exposing the hinges thereof which can be aligned with mounts existing on the edge of the roof. Thereafter, the hinges are fixedly secured to the mounts by any suitable means, such as bolts, and the closure is latched to the body. As installed, the closure 10 renders the vehicle 54 more aerodynamically streamlined, thereby reducing drag on the vehicle when in motion. Further, the relative vertical, and in one alternative recessed, orientation of the window in the closure serves to limit solar exposure of the vehicle passenger compartment and storage compartment and to restrict vision into the storage compartment. It will be apparent to the skilled artisan that the hatchback or liftback closure of the present invention is sized so as to retrofit any motor vehicle manufactured with a hatchback or liftback closure.

It should be noted that the upper and side peripheral edges of the closure of the present invention as viewed from the top and/or side may be arcuate or a straight line depending upon the vehicle opening into which the closure is fitted. Also, it should be noted that the side portions 26 of the body member may be arced uniformly along the entire length thereof or may be increasingly or decreasingly arced so as to provide for diverging or converging side portions as viewed from the top of the closure.

Various embodiments and modifications of this invention have been described in the foregoing description, and further modifications will be apparent to those skilled in the art. Such modifications are included within the scope of this invention as defined by the following claims.

I claim:

1. A closure kit to be retrofitted to a motor vehicle for releasably isolating the passenger compartment and the storage compartment of said motor vehicle from the elements, said motor vehicle having an engine compartment, a passenger compartment and a storage compartment, the closure kit comprising:
    a frame member having an aperture therethrough;
    a body member adapted to be fixedly secured to said frame member, said body member integrally formed by a roof portion, a window portion depending from said roof portion at an acute angle greater than 60° and having a window therein, a rear deck portion extending substantially perpendicularly from said window portion a predetermined distance and having an aperture therethrough which is aligned with the aperture through said frame member, and side portions extending from said roof portion a predetermined distance, said side portions being arced along substantially the entire length thereof from the edge thereof to the rear deck portion and terminating into said rear deck portion, each of said side portions defining a peripheral edge of said closure; and
    a latch adapted to be positioned within said aligned apertures to releasably secure said frame member and said body member to said motor vehicle.

2. The closure kit of claim 1 wherein said frame member has a generally parallelepiped configuration and comprises a pair of substantially parallel, spaced apart end members and a pair of substantially parallel, spaced apart side members, said pair of end members being integrally connected to said pair of side members.

3. The closure kit of claim 2 wherein the outer peripheral configuration of said body member is sized to uniformly overlap the outer peripheral configuration of said frame member.

4. The closure kit of claim 3 wherein said extending rear deck portion terminates in a perpendicularly biased flange which extends along substantially the entire width of the closure.

5. The closure kit of claim 1 wherein said window portion substantially vertically depends from said roof portion.

6. The closure kit of claim 2 wherein said frame member has a pair of hinges fixedly secured to one of said spaced apart end members and said hinges are adapted to be releasably secured to mounts positioned on the edge of the roof of said motor vehicle.

7. The closure kit of claim 1 wherein said window portion is planar.

8. The closure kit of claim 1 wherein said side portions are increasingly arced along substantially the entire length thereof so that the side portions rearwardly converge.

9. The closure kit of claim 2 wherein one of said pair of end members and each of said pair of side members of said frame member define a substantially continuous U-shaped channel, the other of said pair of end members having one of said aligned apertures therethrough, and the inner wall of said U-shaped channel of each of said side members being uniformly tapered along the entire length thereof from said one of said pair of end members to the other.

10. A closure installed into the body of a motor vehicle having an engine compartment, a mid passenger compartment and a storage compartment, said closure serving to releasably isolate said mid passenger compartment and said storage compartment from the elements, said closure comprising:
    a frame member consisting of a pair of substantially parallel, spaced apart end members and a pair of substantially parallel, spaced apart side members integrally connected to said end members,
    a body member fixedly secured to said frame member and having an outer peripheral configuration which uniformly overlaps the outer peripheral configuration of said frame member, said body member integrally comprised of a roof portion defining a peripheral edge of said closure and extending the entire width of said closure, a window portion substantially vertically depending from said roof portion and having a window centrally positioned therein, a rear deck portion extending from said window portion and terminating in a perpendicularly biased flange which extends along substantially the entire width of the closure, side rear deck portion being substantially perpendicular to said window portion, and side portions extending from said roof portion substantially to said biased flange, said side portions being arced from the edge thereof to said rear deck portion along substantially the entire length thereof and integrally terminating into said rear deck portion, each of said side portions defining a peripheral edge of the closure;
    a pair of hinges fixedly secured to one of said end members and releasably secured to mounts positioned on said motor vehicle, the other of said end members and said rear deck portion having aligned apertures therethrough; and
    a latch positioned in said aligned apertures, said latch releasably securing the closure to said motor vehicle.

11. The closure of claim 10 wherein said side portion are beveled along said integral termination to provide for a smooth transition between said side portions and said rear deck portion.

* * * * *